(12) United States Patent
Zajicek et al.

(10) Patent No.: US 7,322,633 B2
(45) Date of Patent: Jan. 29, 2008

(54) RELEASEABLE HINGE FOR TRUCK BED COVER

(75) Inventors: Jason Zajicek, Portage, WI (US); Kevin Last, Madison, WI (US); Scott Burmeister, Libertyville, IL (US)

(73) Assignee: Penda Corporation, Portage, WI (US)

( * ) Notice: Subject to any disclaimer, the term of this patent is extended or adjusted under 35 U.S.C. 154(b) by 0 days.

(21) Appl. No.: 11/584,061

(22) Filed: Oct. 20, 2006

(65) Prior Publication Data

US 2007/0096499 A1 May 3, 2007

Related U.S. Application Data

(60) Provisional application No. 60/731,130, filed on Oct. 28, 2005.

(51) Int. Cl.
*B60P 7/02* (2006.01)

(52) U.S. Cl. .................... 296/100.06; 16/382

(58) Field of Classification Search .......... 296/100.06, 296/100.02, 100.07, 100.08, 100.1; 16/382
See application file for complete search history.

(56) References Cited

U.S. PATENT DOCUMENTS

| | | | |
|---|---|---|---|
| 6,109,681 A | 8/2000 | Edwards et al. | |
| 6,273,491 B1 | 8/2001 | Bath et al. | |
| 6,382,700 B2 | 5/2002 | Young et al. | |
| 6,427,500 B1 | 8/2002 | Weinerman et al. | |
| 6,702,360 B1 | 3/2004 | Santos et al. | |

*Primary Examiner*—Joseph D. Pape
(74) *Attorney, Agent, or Firm*—Knechtel, Demeur & Samlan

(57) ABSTRACT

A releasable hinge for attaching tonneau covers to the cargo compartment of pickup trucks. The hinge has a hinge mechanism fastened to the bottom or underside of the tonneau cover. A complementary locking tab is mounted to the cab end of the cargo compartment. The hinge mechanism has a plate with a locking tongue that is received in a locking channel in the locking tab to latch the tonneau cover to the cargo compartment. To remove the tonneau cover from the cargo compartment, the tonneau cover is raised above a predetermined angle which disengages the locking tongue from the locking channel. This allows the hinge to separate from the locking tab. Any gas struts are released from their mounting brackets and the tonneau cover can be removed from the cargo compartment.

20 Claims, 15 Drawing Sheets

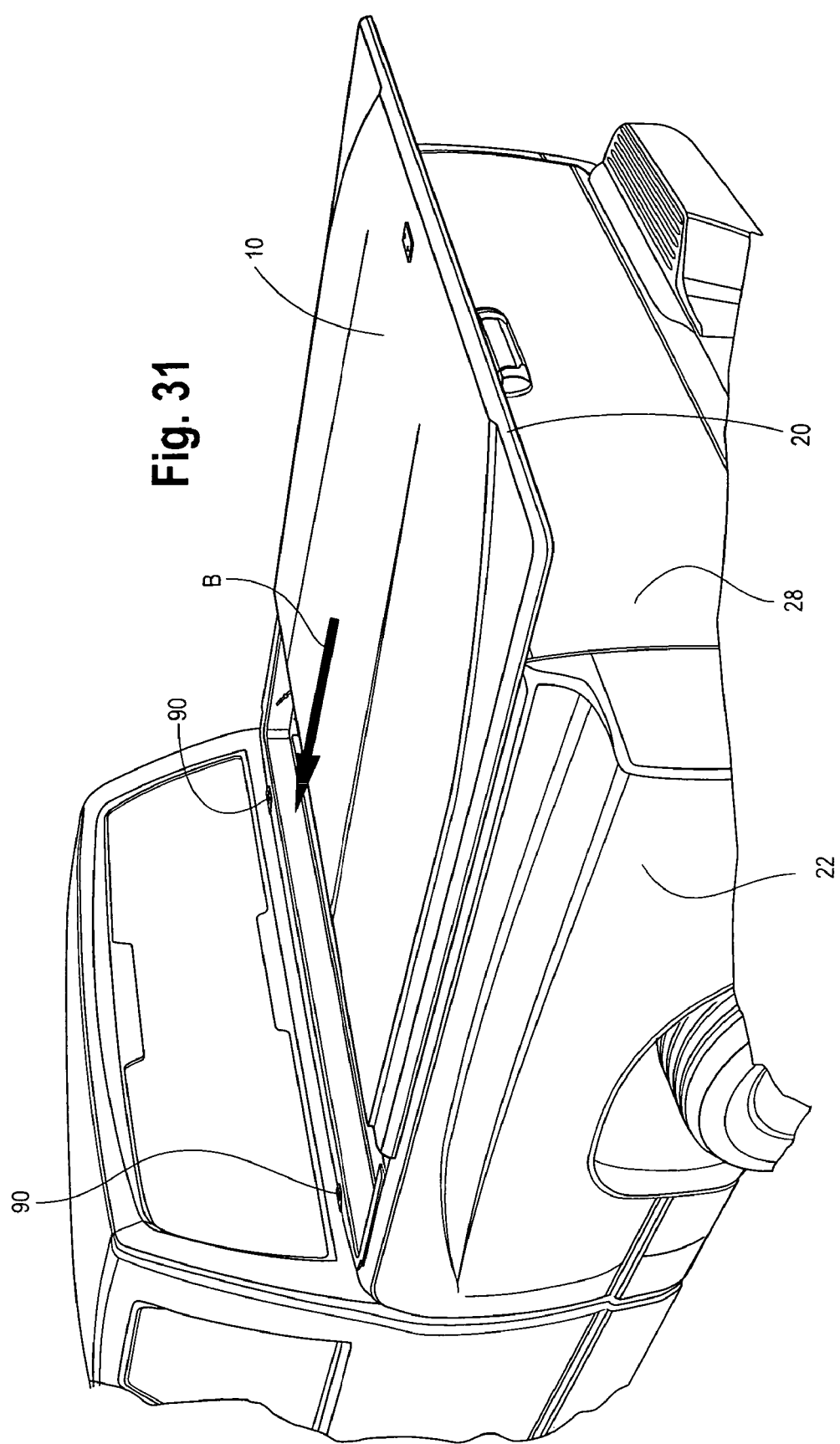

RELEASEABLE HINGE FOR TRUCK BED COVER

CROSS REFERENCE TO RELATED APPLICATION

This application is based on and claims priority of provisional patent application 60/731,130 filed Oct. 28, 2005.

BACKGROUND OF THE INVENTION

This invention relates to a hinge mechanism for releaseably attaching tonneau covers to the cargo compartment of pickup trucks.

Pickup trucks have rectangular shaped beds at the rear of the vehicle, generally with a pivoting tailgate that pivots downwardly and in a rearward direction to a flat, horizontal plane that is generally in the same plane as the floor of the bed. Pickup trucks are used for numerous purposes for hauling all types of articles that vary in size, shape and weight. At times it is beneficial that the bed be covered to protect the articles being transported.

Various covers have been used in the past. There are essentially two types of covers. One type is comprised of flexible covers including canvas, other fabrics and flexible vinyl covers. The flexible cover is secured to the pickup truck by ropes, flexible cords and other straps that are secured by hooks, ties, snaps and other fasteners. These types of covers are unsatisfactory in that they are extremely time consuming to put in place and secure to the truck, with a similar amount of time required to remove them. Due to the flexible characteristics of the cover, they allow water to pool in low spots, rather than run off and onto the ground. Due to their lack of structural strength, they do not permit the user to walk on them or to install other items, such as racks, onto the flexible cover.

As an alternative to flexible cover, a second type of cover, also called a tonneau cover, has gained popularity. These are rigid covers comprised of one piece rigid covers and multi-piece sectional rigid covers. Metal and rigid plastic covers have been introduced and are usually pivotally connected to the front portion of the cargo compartment or bed. These allow the user to raise the cover from the rear of the bed, place the items in the bed, and lower the cover to protect the items. Generally hinges and other connectors are used to connect the cover to the truck bed or truck body. These connectors are not readily or easily removed if the cover is to be removed from the cargo bed for additional storage space. Thus, there is not a quick and convenient attachment means for easily and quickly attaching and removing rigid tonneau covers from the cargo compartment.

U.S. Pat. No. 6,447,045 issued to Dickson et al. illustrates a tonneau cover mounting system that utilizes a pair of hinges mounted on opposite sides of the truck bed. The hinge mechanism allows the cover to pivot away from the cab as it is opened to allow for the cover to be mounted close to the cab. However, this device does not illustrate a means for easily detaching the cover from the truck bed or for easy re-attachment.

Other prior art patents that illustrate various tonneau covers are U.S. Pat. Nos. 6,547,310 and 6,857,683 both issued to Myers and U.S. Pat. No. 6,340,194 issued to Muirhead et al. None of these patents address the problem of easily removing and then re-attaching the tonneau cover to the truck bed. In fact, none of these patents even address the problem of easily attaching and removing the tonneau cover from the truck bed. They merely describe a hinge attachment at the front of the cover for pivotally attaching the cover to the truck bed.

SUMMARY OF THE INVENTION

Applicant's releasable hinge has a hinge mechanism mounted to the tonneau cover that is separable from a complementary locking tab mounted to the truck bed at the cab end of the truck bed. The hinge mechanism has a top plate portion mounted to the tonneau cover and another portion of the hinge mechanism releaseably attached to a complementary locking tab mounted to the truck bed. The hinge mechanism has a mid plate with a locking tongue that is received in a locking channel in the locking tab to latch the tonneau cover in place on the truck bed. To remove the tonneau cover, the rear portion of the tonneau cover is raised above a predetermined angle, generally greater than approximately 23°, which releases the locking tongue from the locking tab. If the cover has gas struts to assist in opening and closing the tonneau cover, at least one end is released from its attachment means. Once the locking tongue disengages from the locking tab, the hinge portion attached to the tonneau cover can separate from the locking tab which allows the tonneau cover to be removed.

OBJECTS AND ADVANTAGES

Thus, it is an object of the invention to provide an attachment means for easily attaching and removing a rigid tonneau cover to a truck bed. It is another object to provide an attachment means that once installed to the truck bed and tonneau cover, allows the tonneau cover to be attached and removed without tools. Related to this object is to provide a releasable attachment means that does not interfere with the tonneau cover pivoting to an open position to access the storage bed. These and other objects and advantages will be apparent from reading the Description of the Preferred Embodiment.

DESCRIPTION OF THE DRAWINGS

FIG. 31 is a perspective view of the tonneau cover positioned on the truck bed prior to its being moved horizontally into the latched position.

DESCRIPTION OF THE PREFERRED EMBODIMENT

Figure 1:
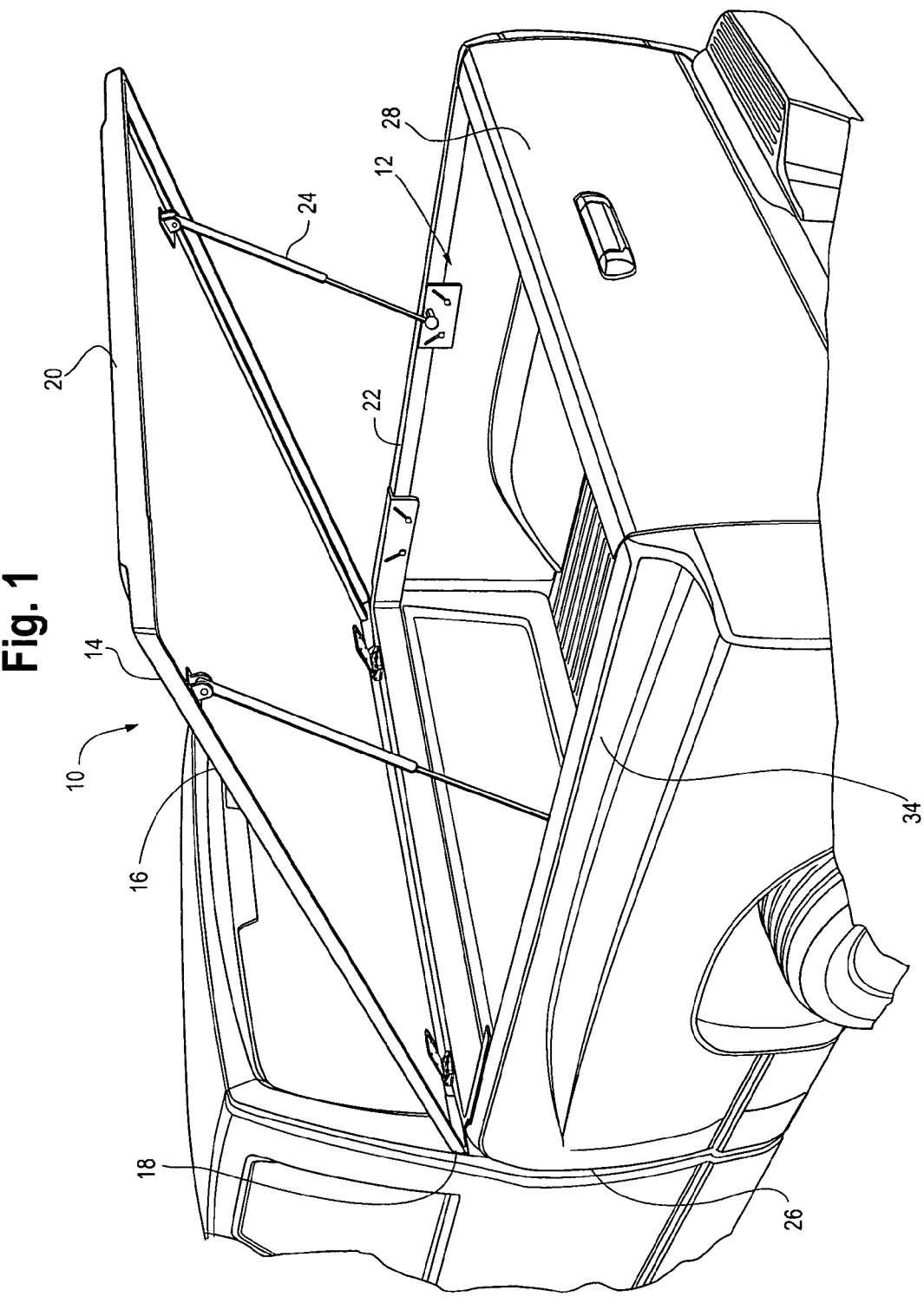
FIG. 1 is a perspective view of the inventive hinge mechanism connecting a tonneau cover to a truck bed.

Turning first to FIG. 1, there is illustrated a tonneau cover 10 in its opened or raised position over a cargo bed 12 of a pickup truck. The cover 10 has a smooth top surface 14 with side overhanging edges 16 and a front and rear overhanging edge 18 and 20. Grain, texture or various surface geometries and patterns can be formed into the top surface 14. The overhanging edges 16, 18 and 20 extend over upstanding walls 22 of the cargo bed 12 so that water runs off the top surface 14 and does not enter into the cargo bed 12. Gas charged or air cylinders 24 control the speed at which the cover 10 is raised and lowered. They can also assist in keeping the cover 10 in the raised position until the user desires to lower the cover 10 to cover the cargo bed 12. They further restrict the height to which the tonneau cover 10 can be raised. The cargo bed 12 has a front end 26 adjacent to the truck cab and a tailgate 28 at a rear end.

Figure 2:
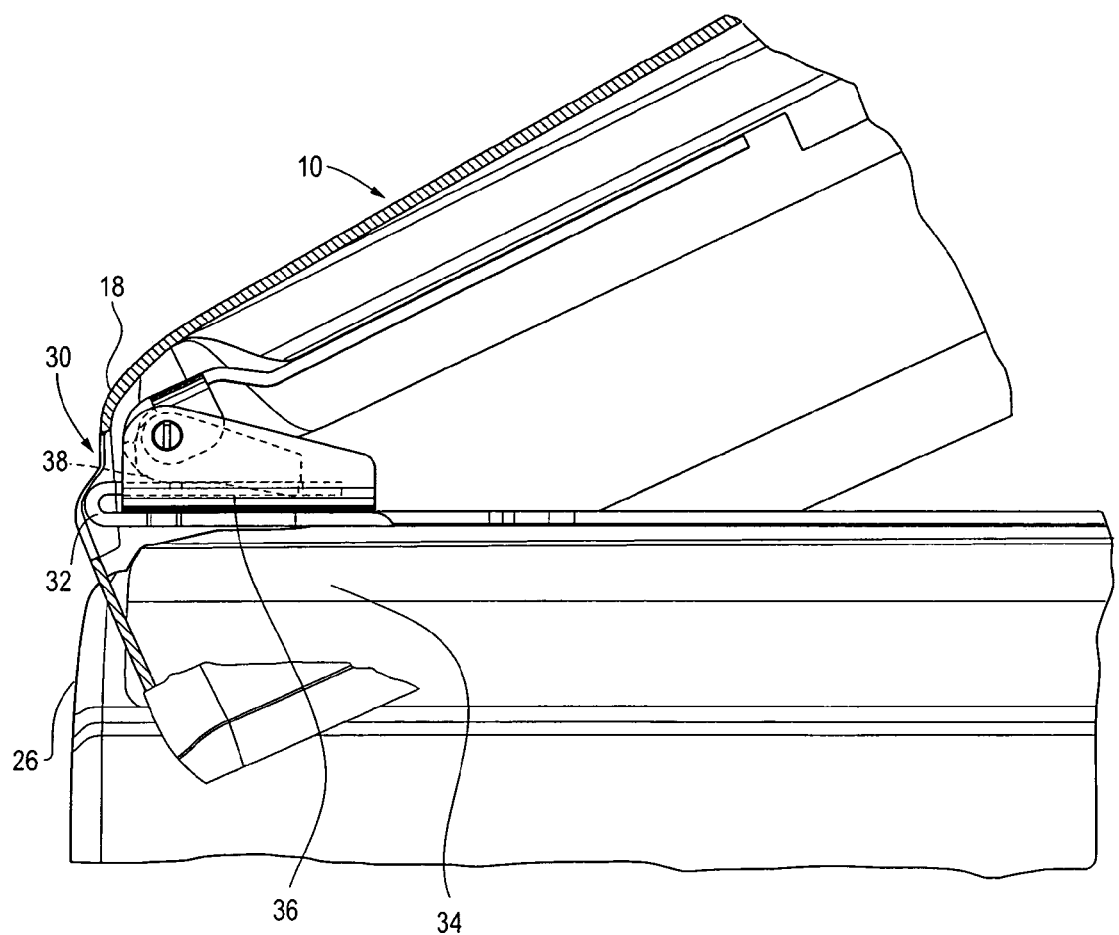
FIG. 2 is a side view with portions removed of the tonneau cover in a raised position with respect to the truck bed with the inventive hinge mechanism in the latched position attaching the tonneau cover to the truck bed.

FIG. 2 illustrates the tonneau cover 10 partially in cross section in its opened position. A hinge mechanism 30 pivotally connects the tonneau cover 10 to the cargo bed 12 adjacent to the front end 26. There is a front frame 32 attached to the front end 26. The front frame extends across the front end 26 and partially around opposite side 34 of the cargo bed 12. The hinge mechanism 30 is comprised of a bottom plate 36, a mid plate 38 and a top plate 40, which will be more fully described later.

Figure 3:
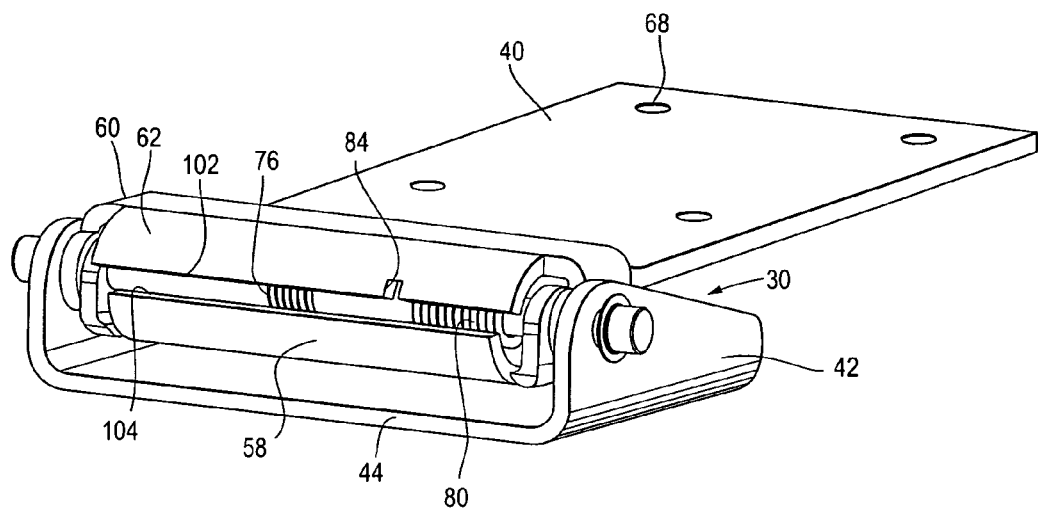
FIG. 3 is rear perspective view of the hinge mechanism.
Figure 4:
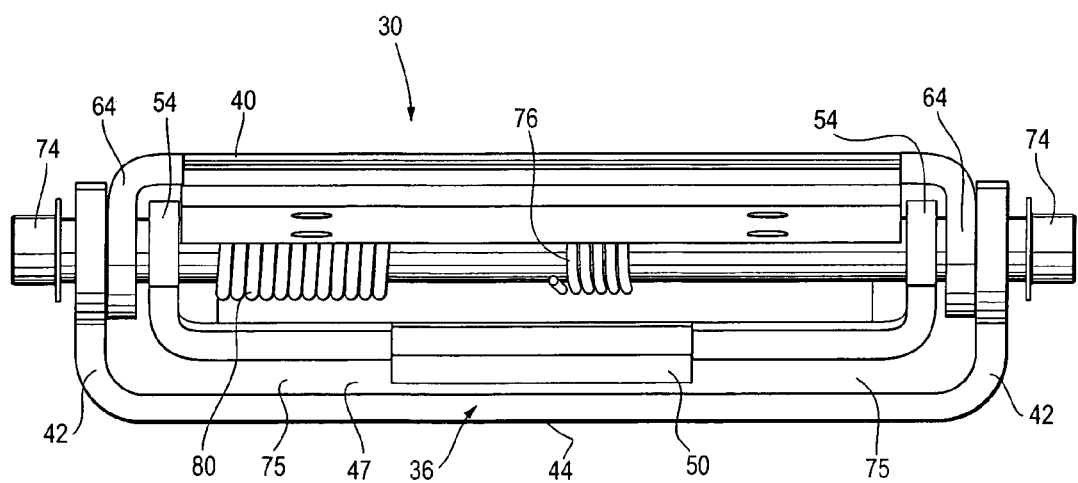
FIG. 4 is a front view of the hinge mechanism.
Figure 9:
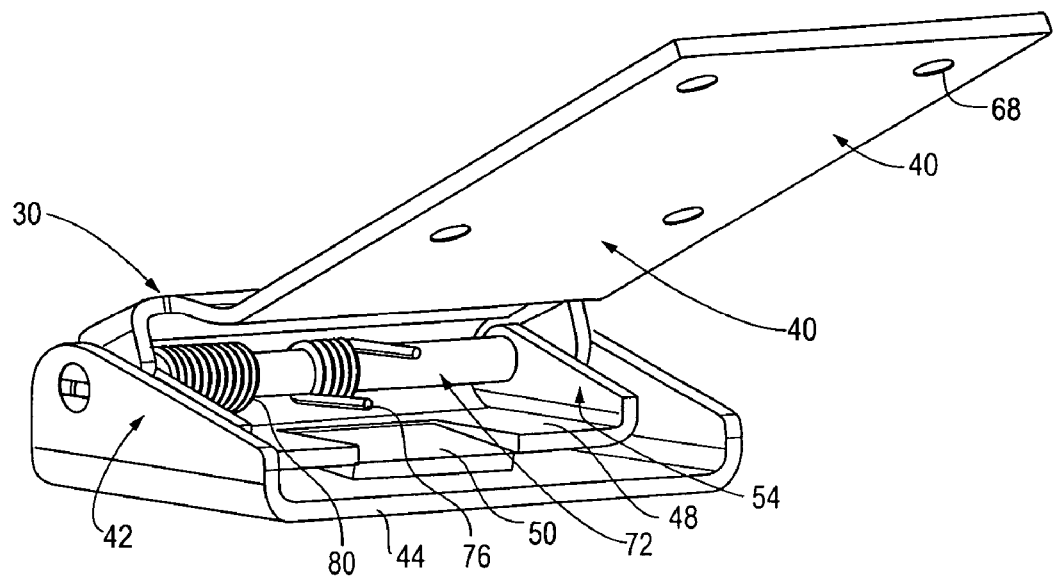
FIG. 9 is a front perspective view of the hinge mechanism.
Figure 10:
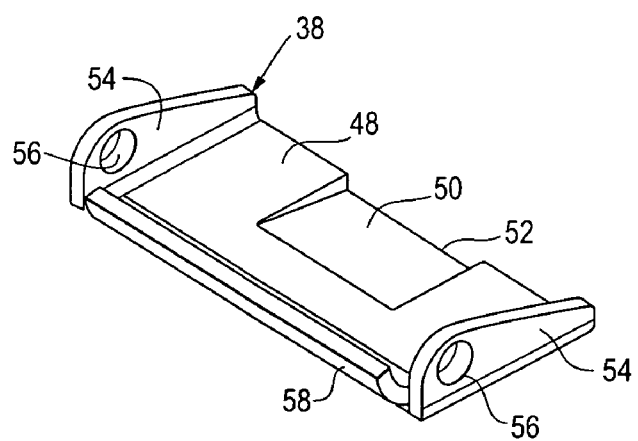
FIG. 10 is a perspective view of the hinge mid plate.

FIGS. 3, 4 and 9 illustrate the hinge mechanism 30 in greater detail. The bottom plate 36 is comprised of opposite bottom plate sides 42 and a bottom 44 such that it is generally of a u-shaped configuration. This is seen in FIGS. 3 and 14-16. Each side 42 has a pin hole 46 passing through the side 42. There is an entrance channel or elongated open slot 47 at one end of the hinge mechanism 30 which is at the front end 18 of the tonneau cover 12.

Figure 11:
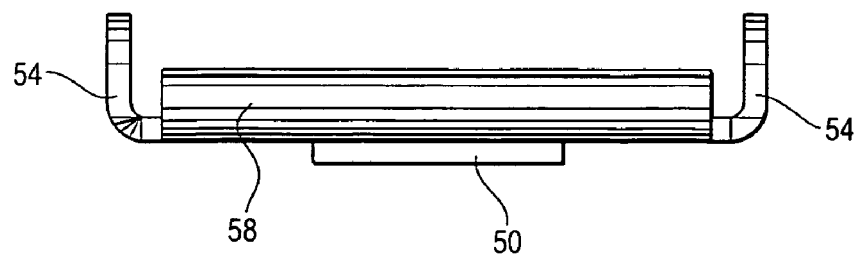
FIG. 11 is an end view of the hinge mid plate.
Figure 12:
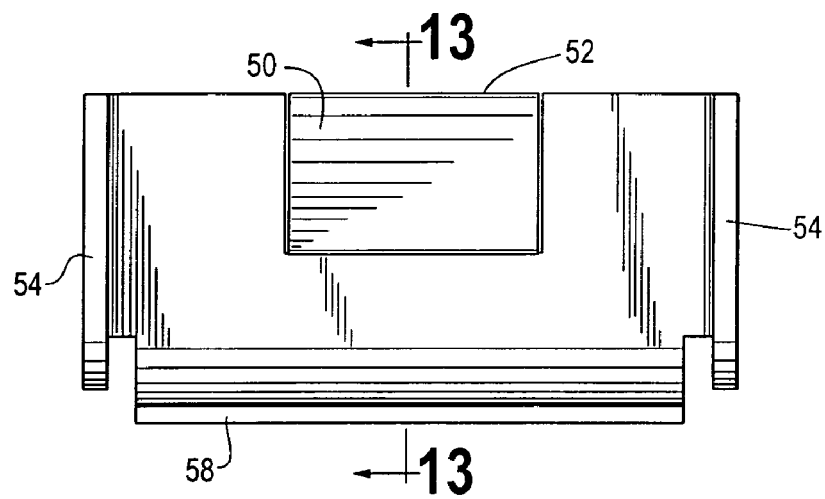
FIG. 12 is a top plan view of the hinge mid plate.
Figure 13:
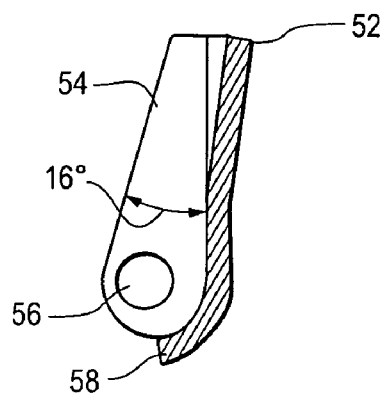
FIG. 13 is a cross sectional view taken along line 13-13 of FIG. 12 of the hinge mid plate.
Figure 14:
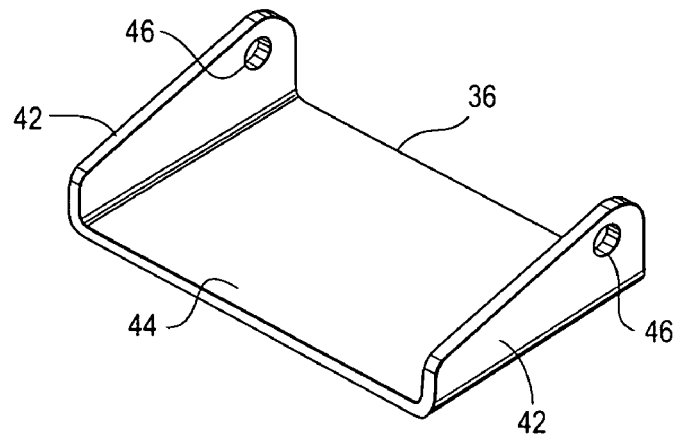
FIG. 14 is a perspective view of the hinge bottom plate.
Figure 15:
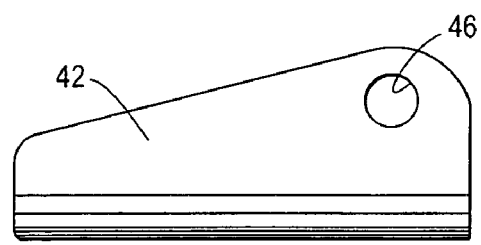
FIG. 15 is a side view of the hinge bottom plate.
Figure 16:
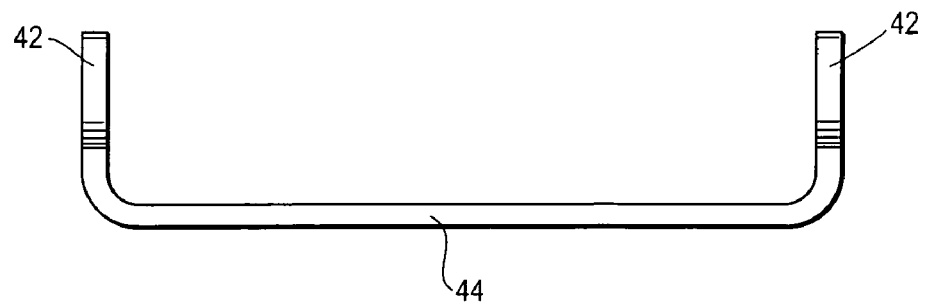
FIG. 16 is an end view of the hinge bottom plate.
Figure 17:
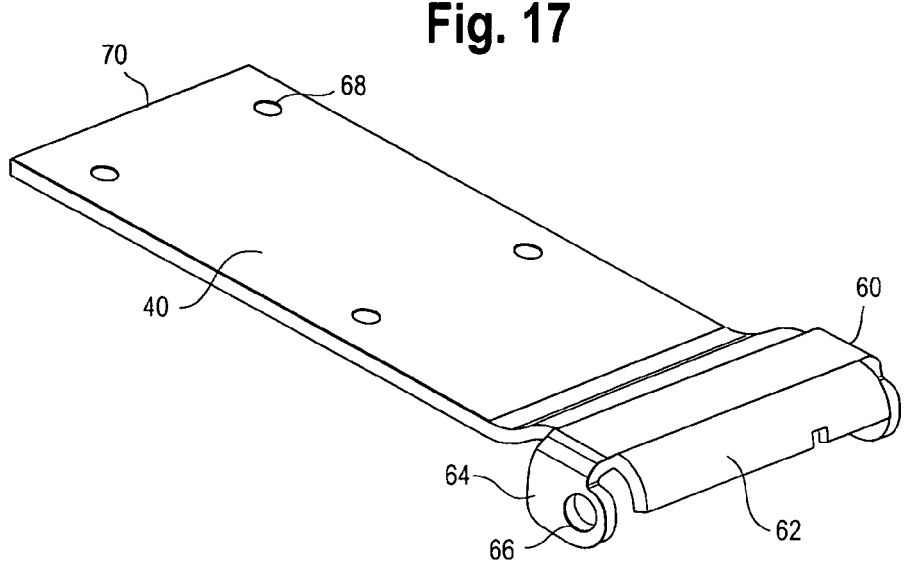
FIG. 17 is a perspective view of the hinge top plate.

FIGS. 3, 4 and 9-13 illustrate the mid plate 38 in greater detail. There is a mid plate bottom 48 having a centrally disposed locking tongue or latch 50. The locking tongue 50 extends from approximately the center of the bottom plate 48 downward such that a distal end 52 extends below the bottom of the mid plate bottom 48. There are upright mid plate side walls 54 at opposite sides of the mid plate bottom 48 such that the end view of FIG. 11 shows the mid plate 38 being generally u-shaped. There are pin holes 56 in each of the mid plate side walls 54. There is a mid plate curved back 58 at the proximal end of the mid plate bottom 48 which is opposite the distal end 52 of the locking tongue 50.

Figure 18:
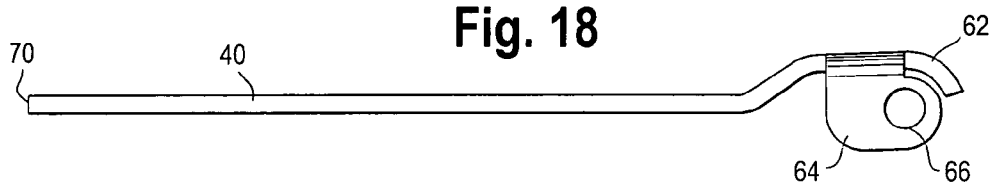
FIG. 18 is a side view of the hinge top plate.
Figure 19:
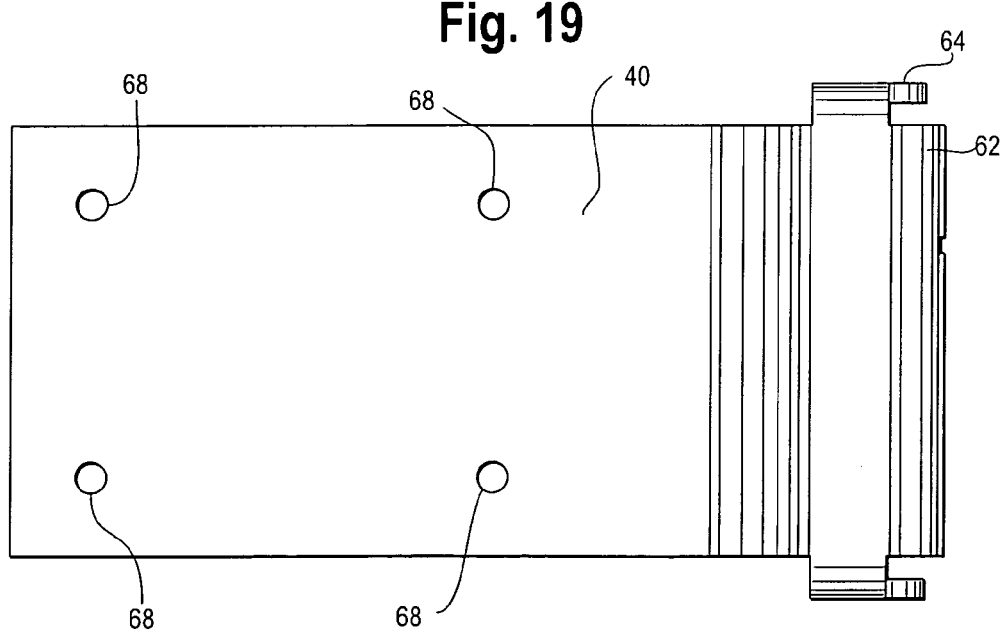
FIG. 19 is a top plan view of the hinge top plate.
Figure 20:
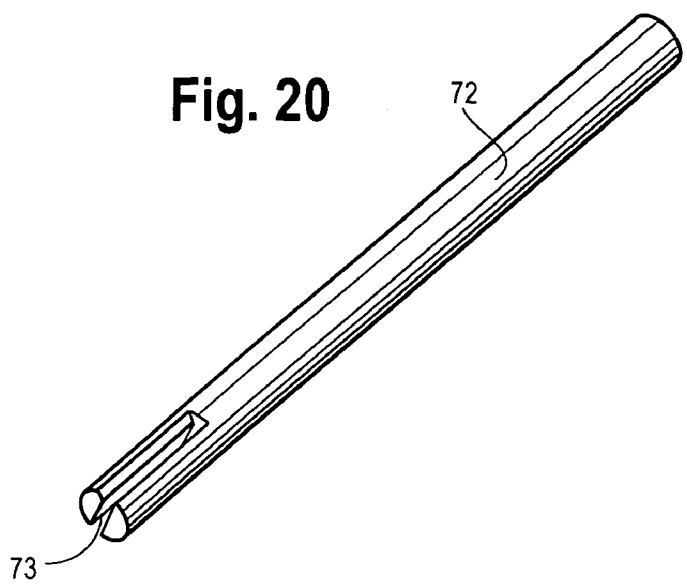
FIG. 20 is a perspective view of the split pivot pin.
Figure 27:
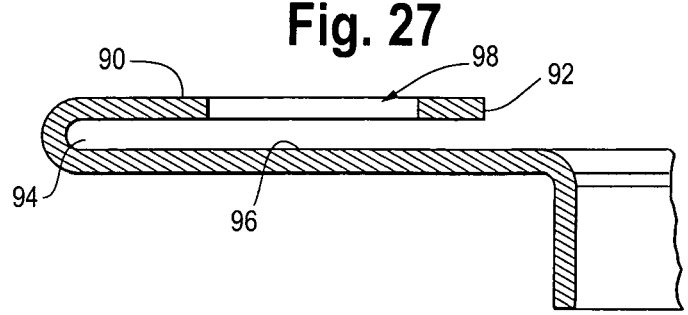
FIG. 27 is a cross section view of the front mounting frame taken along line 27-27 of FIG. 24.

FIGS. 3, 4, 9 and 17-19 also illustrate the components of the top plate 40. There is a proximal end 60 having a top plate curved back 62. Also at the proximal end 60 is a pair of opposite top plate side walls 64 with pin holes 66 passing through the side plate walls 64. Passing through the top plate 40 are a plurality of fastener holes 68. As seen in FIG. 18 the top plate 40 drops down from the proximal end 60 and then extends at a slightly upward angle to a distal end 70. Fasteners such as screws, bolts, rivets, or other generally known fasteners pass through the fastener holes 68 and attach the top plate 40 to the tonneau cover 10 as seen in FIG. 27.

Figure 22:
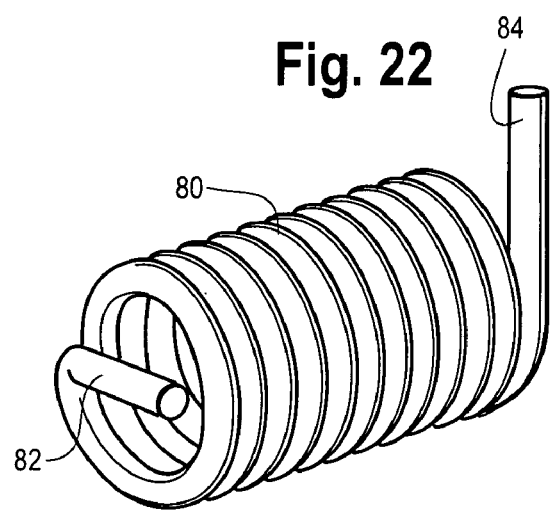
FIG. 22 is a perspective view of the heavy torsion spring.

FIG. 4 illustrates the assemblage and the pivoting relationship of the individual hinge mechanism components. A split pin 72 with a split end 73 (FIG. 22) extends through the pin holes 46 in the bottom plate sides 42, then through the pin holes 66 in the top plate side walls 64, and through the pin holes 56 in the mid plate side walls 54. There are locking end caps 74 to securely keep the split pin 72 within the hinge mechanism 30. The bottom plate 36, mid plate 38 and top plate 40 all rotate, within rotational limitations, about the split pin 72. The entrance channel 47 leads into a channel or gap 75 which is formed between the bottom plate 36 and the mid plate 38. The locking tongue 50 extends into this channel or gap 75.

Figure 5:
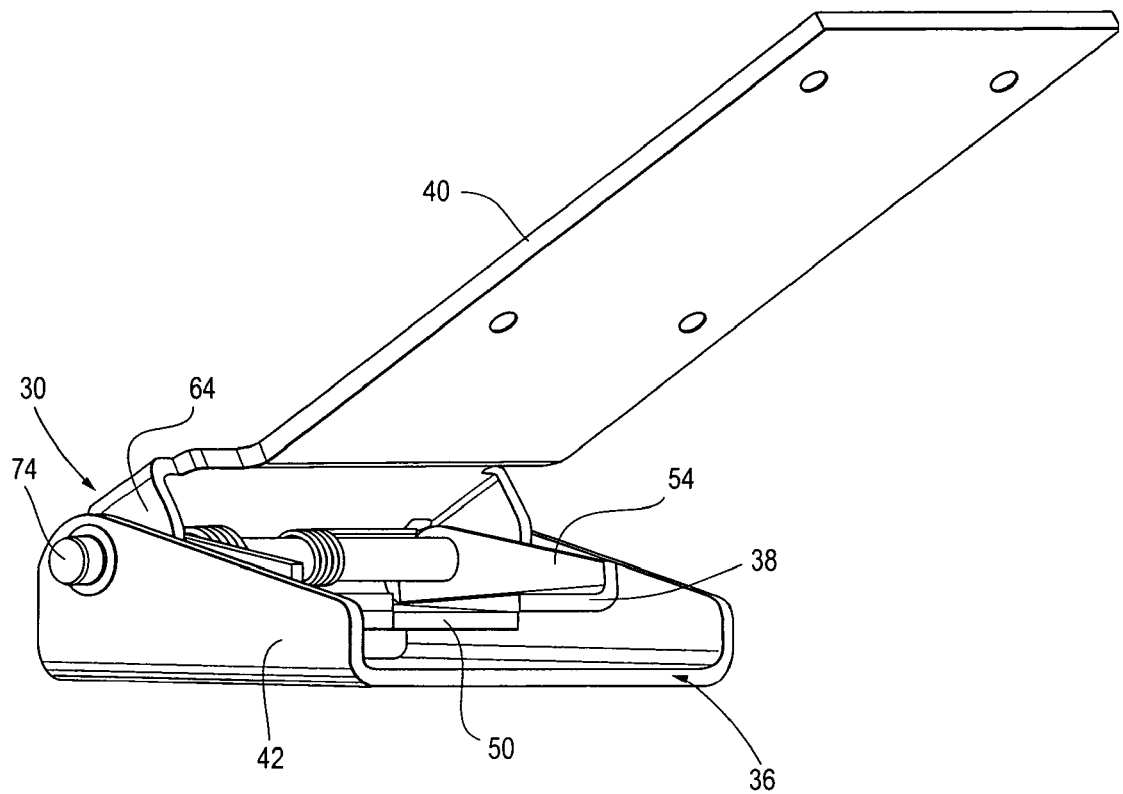
FIG. 5 is a front perspective view of the hinge mechanism.
Figure 21:
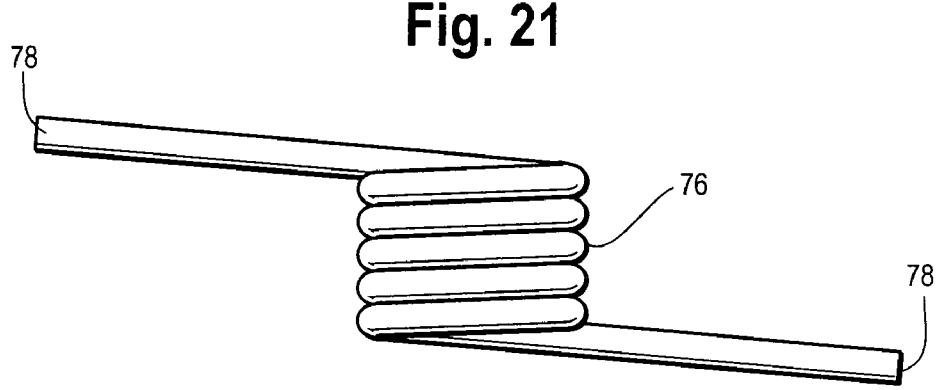
FIG. 21 is a top plan view of the light torsion spring.

A light duty torsion spring 76 having opposite ends 78 (FIG. 21) is wrapped around the split pin 72 as seen in FIGS. 3-5. The spring 76 assists in forcing the locking tongue 50 in a downward direction as will be described in greater detail herein. A heavy duty torsion spring 80 is also wrapped around the split pin 72 and has one end 82 inserted into the split end 73 and an opposite end 84 secured to the top plate curved back 62 (see FIG. 3). The purpose of the heavy duty torsion spring 80 is to provide a closing force to assist in pulling the top plate 40 towards the bottom plate 36 to facilitate installation of the tonneau cover 12 while the tonneau cover 12 is in the flat, horizontal or down position.

Figure 6:
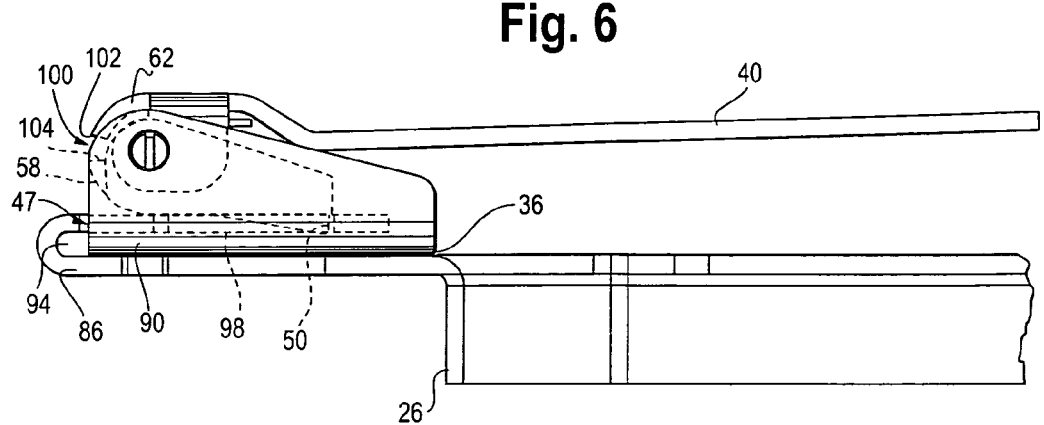
FIG. 6 is a side view with portions removed of the hinge mechanism in the closed position mounted on the front frame member that is mounted to the truck bed.
Figure 7:
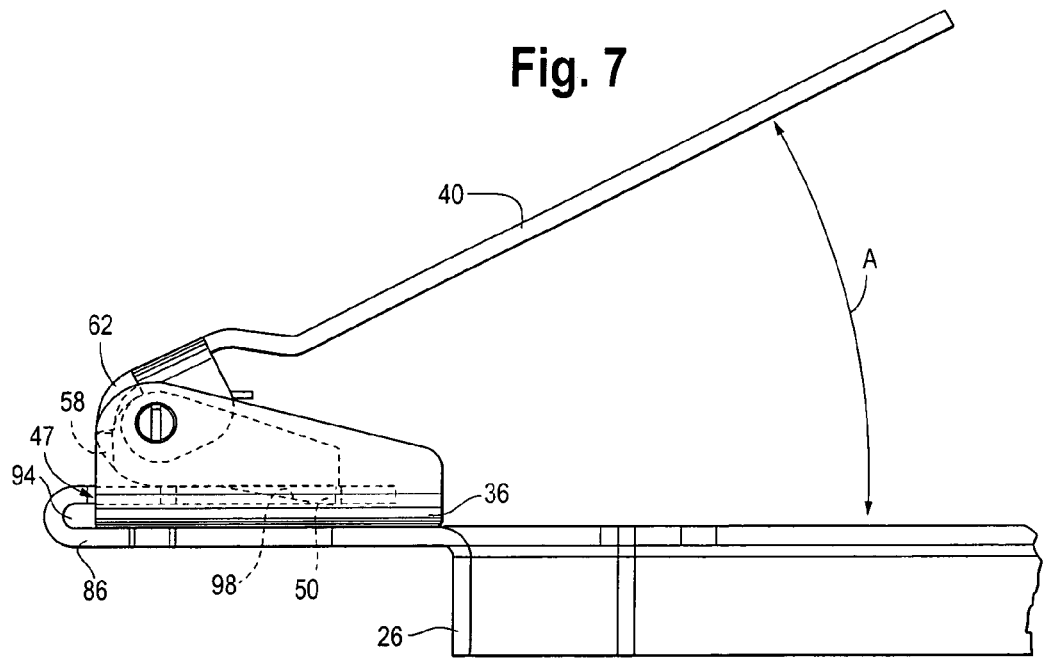
FIG. 7 is a side view with portions removed of the hinge mechanism in the open position mounted on the front frame member that is mounted to the truck bed.
Figure 8:
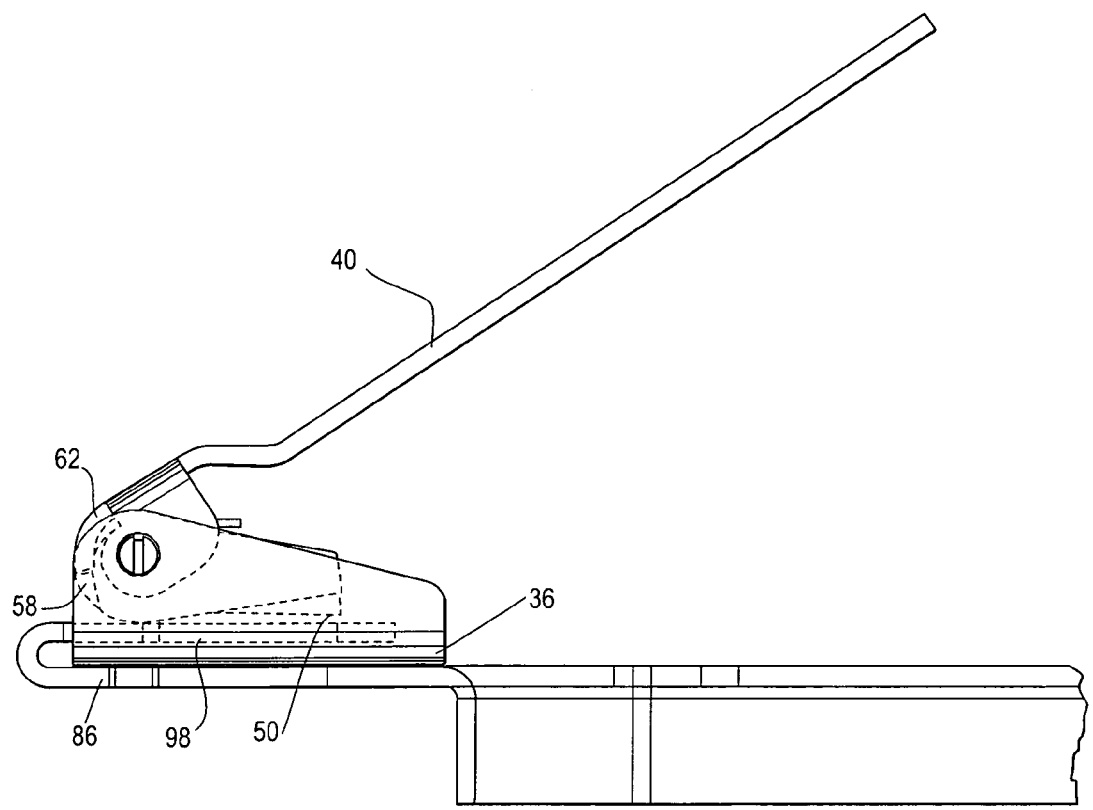
FIG. 8 is a side view with portions removed of the hinge mechanism in the open removal position with the hinge mechanism unlatched from the front frame member that is mounted to the truck bed.
Figure 23:
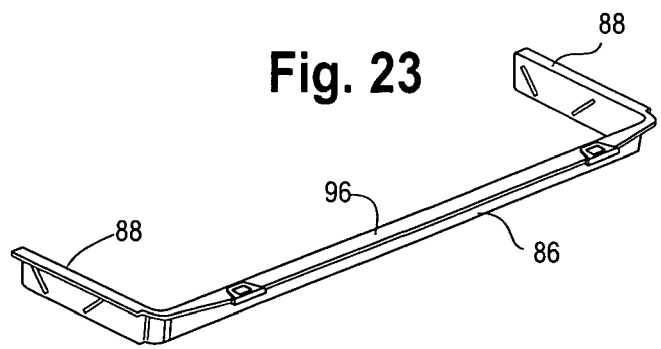
FIG. 23 is a perspective view of the front mounting frame that is attached to the truck bed.
Figure 24:
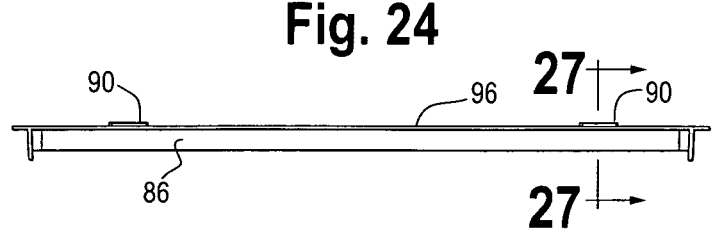
FIG. 24 is a front view of the front mounting frame that is attached to the truck bed.
Figure 25:
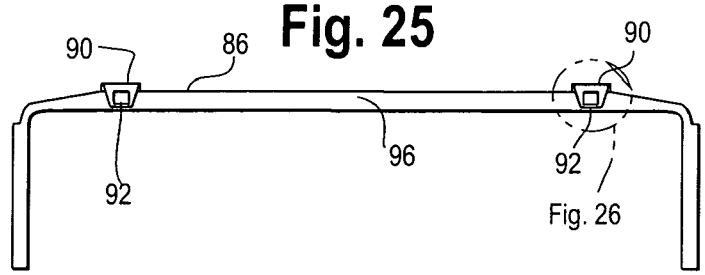
FIG. 25 is a top plan view of the front mounting frame that is attached to the truck bed.
Figure 26:
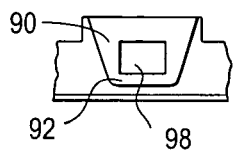
FIG. 26 is an enlarged view of the circled portion marked "A" in FIG. 25 showing the locking tab on the front mounting frame.
Figure 29:
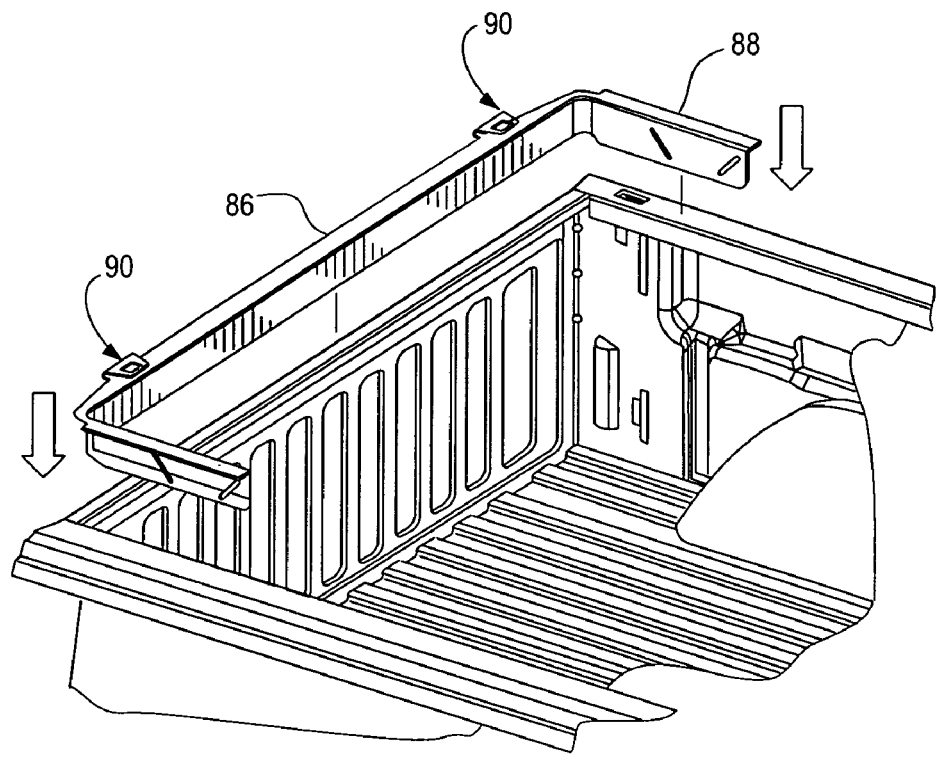
FIG. 29 is a perspective view of the front mounting frame showing its orientation over the truck bed prior to its installation.
Figure 30:
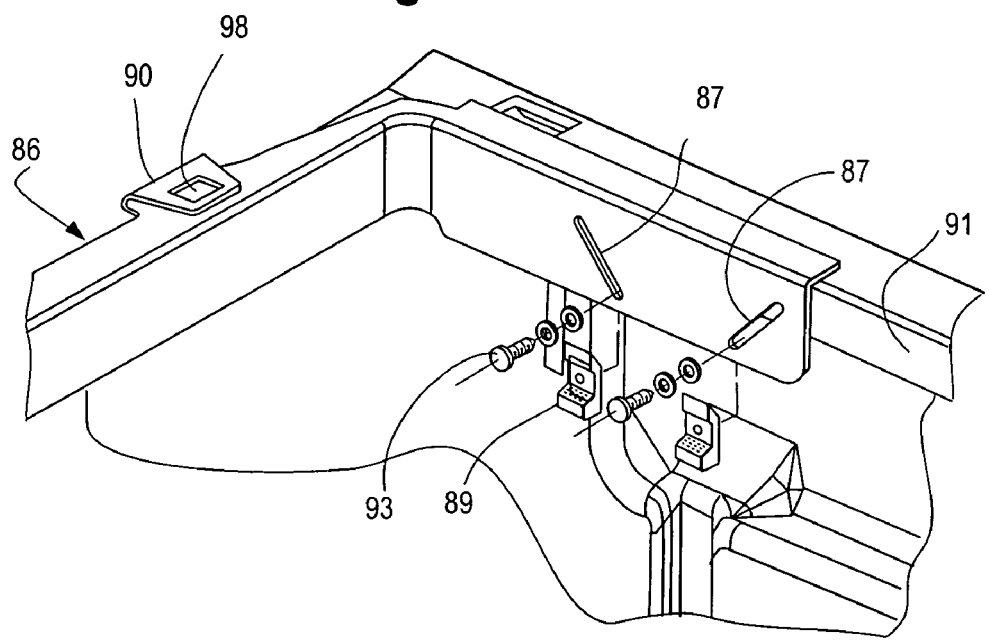
FIG. 30 is a perspective view with portions removed of the front mounting frame showing how it is fastened to the front of the truck bed.

A front frame 86, which is illustrated in FIGS. 23-25, is mounted to the front end 26 of the cargo bed 12 as seen in FIG. 29. The front frame 86 is the complementary portion of the hinge which receives the hinge mechanism 30 as illustrated in FIGS. 6-8. The front frame 86 has a pair of side mounting rails 88 that attach to the upstanding walls 22 on the cargo bed sides 34. The side mounting rails 88 are preferably attached by clamps rather than drilling holes in the cargo bed sides 34. Such clamps are commonly known and available in the industry. FIG. 30 illustrates one such method. Grooves or slots 87 are cut in the sides rails 88. A pair of C-clamps 89 is place behind a truck rail lip 91 that extends around the cargo bed 12. Bolts 93 pass through the grooves 87 and are fastened to the C-clamps 89 to secure the front frame 86 to the cargo bed 12.

A pair of locking tabs 90 is located on the front frame 86. As seen in FIGS. 6, 25, and 27, the tabs 90 extend up from the front frame 86 and then turn back over the front frame 86 in a u-shaped configuration with a leading end 92. This creates an opening or gap 94 between a top surface 96 of the front frame 86 and the locking tab 90. The locking tab 90 has locking means illustrated as a locking channel or opening 98 that is generally rectangular in shape within the locking tab 90. Other shaped openings or recesses can be utilized as the locking means for receiving the locking tongue 50.

Figure 28:
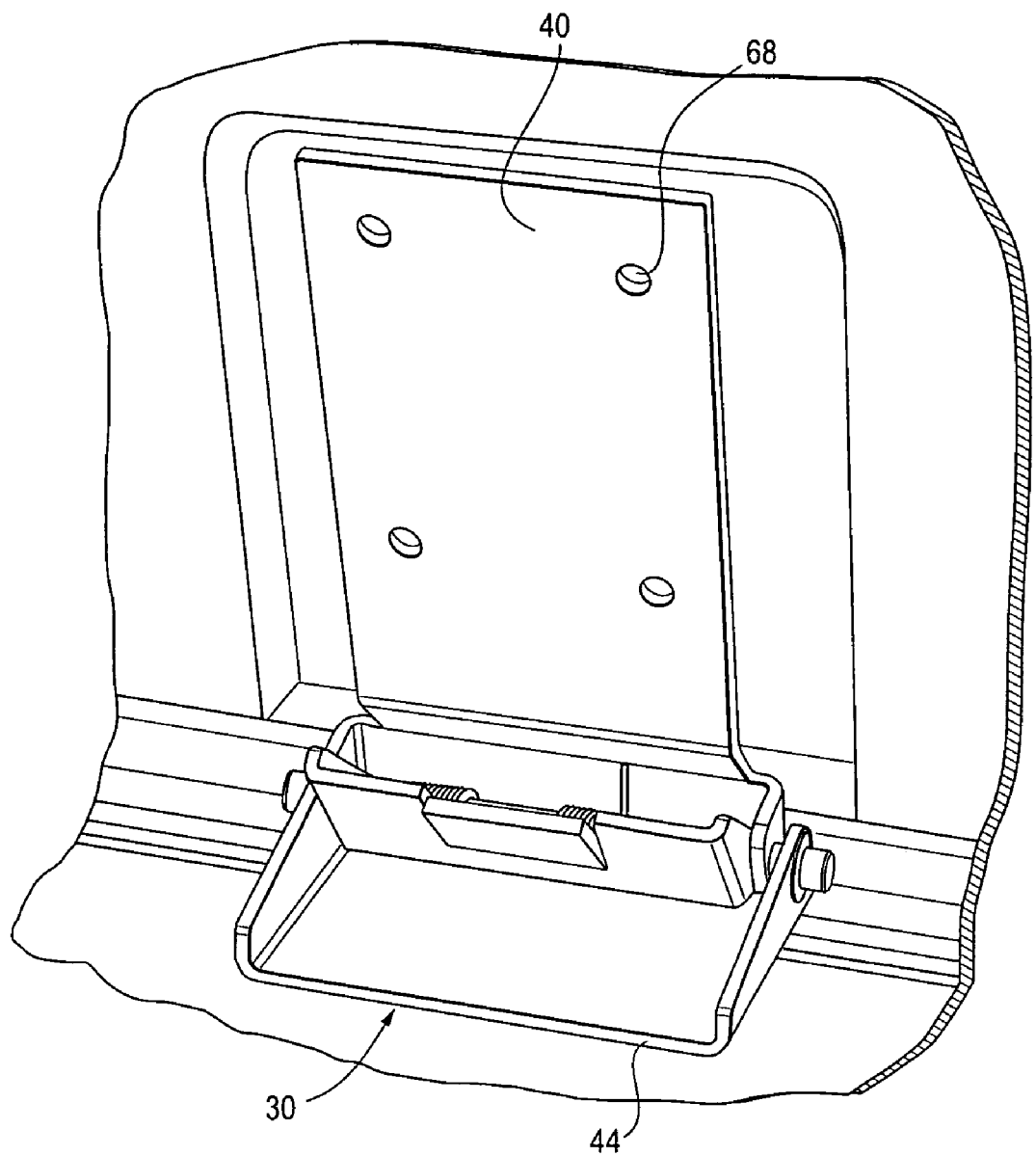
FIG. 28 is an enlarged view of the hinge top plate fastened to the tonneau cover.

To use the hinge mechanism, the user first securely attaches the front frame 86 to the front end 26 or the cargo bed 12 as described above and seen in FIGS. 29 and 30. Alternatively the front frame can be mounted by drilling holes through the front frame 86 and the cargo bed 12 and fastening bolts passed there through. The tonneau cover 10 either has the hinge mechanism 30 already attached to it or the user attaches it to the tonneau cover by fastener means passing through the fastener holes 68 in the top plate 40 into the tonneau cover 10 as previously described and as seen in FIG. 28. The two hinge mechanisms 30 must be separated from each other the same horizontal distance that the locking tabs 90 are separated from each other. Furthermore the two hinge mechanisms 30 must be aligned with their respective locking tables 90.

The installation of the tonneau cover 10 is seen in FIG. 31. With the hinge mechanisms 30 mounted to the tonneau cover, the tonneau cover 10 is raised above and then gently placed on the upstanding walls 22 of the cargo bed 12 with the rear overhanging edge 20 of the tonneau cover 12 extending past the tail gate 28. This results in the entrance channel 47 for each of the hinge mechanisms 30 being separated from but in alignment with their respective locking tab 90.

The tonneau cover 10 is slid forward in the direction of arrow B toward the front end 26 of the cargo bed with the locking tabs 90 in alignment with the entrance channels 47 of the hinge mechanisms 30. The leading end 92 of the locking tab 90 is received in the entrance channel 47 and then slides into the channel 75. The bottom plate 36 slides into the gap 94. The leading end 92 engages the underside of the locking tongue 50 which is biased downwardly due to the force exerted on it by the light duty torsion spring 76. The force of insertion of the locking tab 90 overcomes the slight force of the light duty torsion spring 76 which forces the locking tongue 50 upward. Once the leading end 92 passes the distal end 52 of the locking tongue 50, gravity and the force from the light duty torsion spring 76 forces the locking tongue 50 into the locking channel 98. In this position the hinge mechanism 30 is now securely latched into the front frame 86 and cannot be removed by exerting a horizontal force in the rear direction as the locking tongue 50 engages the locking channel 98 which restricts horizontal movement in the rear direction. Likewise, the tonneau cover cannot move forward as the locking tabs 90 restrict any further forward movement of the tonneau cover 10. The gas or air cylinders 24, which are attached to the tonneau cover 10, are attached to the bed sides 34 in a conventional manner such as a removable clamping bracket or permanently affixed mounting brackets.

With the tonneau cover 10 in the closed position, the hinge mechanism 30 is in the position illustrated in FIGS. 3 and 6, with the tonneau cover 10 removed for clarity. There is a separation or space 100 between a lower edge 102 of the top plate curved back 62 and an upper edge 104 of the mid plate curved back. To release or unlatch the tonneau cover 10 from the locking tabs 90, the tonneau cover 10 is first raised to the fully open position such as seen in FIG. 1. The cylinders 24 restrict the height that the tonneau cover 10 can be raised. As seen in FIG. 7, the separation or space 100 disappears. This is due to the top plate pivoting upward causing the curved back 62 to rotate downward until the lower edge 102 engages the upper edge 104. The tonneau cover 10 is at an angle "A" of about 23°. At this point, the gas or air cylinders 24 are disconnected from their mountings in the cargo bed sides 34. The tonneau cover 10 is then raised further beyond the angle A. As the tonneau cover 10 is raised further, the top plate curved back 62 continues to rotate about the split pin 72 and engages the upper edge 104 of the mid plate curved back 58 causing the mid plate to also rotate about the split pin 72. This rotates the mid plate 38 and the locking tongue 50. The tonneau cover 10 is further raised until the locking tongue 50 is raised sufficiently to clear the locking channel 98 in the locking tab 90. This is illustrated in FIG. 8. In this position the tonneau cover 10 is pulled back toward the tailgate 28 until the locking tongue 50 is at least over the leading end 92 of the locking tab 90 and is clear of the locking channel 98. The tonneau cover can then be fully removed by sliding it off of the cargo bed 12.

Thus there has been provided a hinge that allows for the easy installation and removal of a tonneau cover for pickup trucks that fully satisfies the objects and advantages set forth herein. While the invention has been described in conjunction with a specific embodiment, it is evident that many alternatives, modifications and variations will be apparent to those skilled in the art in light of the foregoing description. Accordingly, it is intended to embrace all such alternatives, modifications and variations.

What is claimed is:

1. A mechanism for attaching a tonneau cover to a cargo compartment of a pickup truck, the cargo compartment having front and a rear walls and opposite side walls, and the tonneau cover having front and rear portions and opposite side portions comprising:

a front frame attached to the front wall of the cargo compartment, a locking tab on the front frame which is slidingly received in a hinge mechanism, the hinge mechanism comprising a top hinge plate attached to the front portion of the tonneau cover, and a middle plate with locking means thereon for engaging in locking relationship the locking tab on the frame when the tonneau cover is moved to a first position over the cargo compartment, and means for releasing the locking means from the locking tab thereby releasing the hinge mechanism from the front frame and allowing the tonneau cover to be removed from the cargo compartment.

2. The mechanism of claim 1 wherein the hinge mechanism further comprises a bottom plate below the middle plate, a locking tongue protruding from the middle plate, a channel defined between the bottom plate and the middle plate, the locking tab on the front frame received in the channel and the locking tongue received in the locking tab for securely attaching the hinge mechanism to the locking tab.

3. The mechanism of claim 2 and further comprising pivot means for pivotally connecting the middle plate to the hinge mechanism for allowing the middle plate to rotate about the pivot means for selectively moving the locking tongue in and out of engagement with the locking tab to either secure or release the hinge mechanism from the locking tab.

4. The mechanism of claim 3 and further comprising means on the top plate for engaging the middle plate for causing the middle plate to rotate responsive to raising the rear portion of the tonneau cover above the rear wall of the cargo bed causing the tonneau cover to rotate about the hinge mechanism whereby when the tonneau cover is raised a predetermined amount the top plate engages and rotates the middle plate which releases the locking tongue from the locking tab and allows the tonneau cover to be removed from engagement with the locking tab.

5. The mechanism of claim 4 wherein the locking tab has an opening therein for receiving the locking tongue in locking engagement.

6. The mechanism of claim 4 wherein when the tonneau cover is raised to an angle of greater than 23° from a horizontal plane the top plate engages and rotates the middle plate so that the locking tongue is released from the locking tab.

7. The mechanism of claim 1 and further comprising a pivot pin on which is mounted the top hinge plate and middle plate.

8. The mechanism of claim 7 wherein the bottom plate mounted on the pivot pin.

9. The mechanism of claim 5 and further comprising spring means for pushing the locking tongue into the opening in the locking tab when the locking tongue is oriented over the locking tab.

10. The mechanism of claim 1 and further comprising a second locking tab on the front frame and second hinge mechanism attached to the front portion of the tonneau cover for engaging in locking relationship the second locking tab.

11. A hinge assembly for pivotally attaching a tonneau cover to a cargo compartment of a pickup truck, the cargo compartment having front, rear and opposite side walls, and the tonneau cover having front and rear portions, the hinge assembly comprising:
    a locking tab attached to the front wall of the cargo compartment, the locking tab comprising a substantially flat plate with latch receiving means therein,
    a hinge mechanism comprising a top hinge plate attached to the front portion of the tonneau cover, a middle plate with latch means thereon for engaging in locking relationship the latch receiving means on the locking tab when the tonneau cover is moved to a first position over the cargo compartment, and
    latch releasing means operatively connected to the latch means for releasing the latch means from the latch receiving means when the rear portion of the tonneau cover is raised above a predetermined angle.

12. The hinge assembly of claim 11 wherein the hinge mechanism further comprises a bottom plate below the middle plate, a channel defined between the bottom plate and middle plate, the latch means extending into the channel, the locking tab received in the channel and the latch means received in the latch receiving means for securely attaching the hinge mechanism to the locking tab.

13. The hinge mechanism of claim 12 wherein the latch releasing means comprises pivot means for pivotally connecting the middle plate to the top hinge plate, the middle plate and top hinge plate pivotable about a common pivotal axis, at least a portion of the top hinge plate engaging at least a portion of the middle plate when the tonneau cover is raised above the predetermined angle causing the middle plate to pivot and the latch to disengage from the latch receiving means.

14. The hinge mechanism of claim 11 wherein the locking tab is mounted on a frame attached to the front of the cargo compartment.

15. The hinge mechanism of claim 14 wherein the locking tab is u-shaped with one leg of the u-shaped locking tab affixed to the frame and the other leg of the u-shaped locking tab configured to be received in the channel.

16. A releasable connecting hinge for attaching a tonneau cover having front and rear portions to a truck bed comprising:
    a locking tab attached to the front portion of the truck bed, the locking tab comprising a plate with latch receiving means therein,
    a top hinge plate attached to the tonneau cover,
    a middle plate pivotally connected to the top hinge plate,
    a bottom plate below the middle plate forming a channel between the bottom plate and the middle plate,
    latch means on the middle plate for engaging the latch receiving means when the tonneau cover is placed in a first locking position with respect to the truck bed and the locking tab is received in the channel, and
    latch releasing means for releasing the latch means from the latch receiving means for allowing the tonneau cover to be removed from the truck bed.

17. The releasable connecting hinge of claim 16 wherein the latch releasing means comprises pivot means for pivotally connecting the middle plate to the top hinge plate, at least a portion of the top hinge plate engaging at least a portion of the middle plate when the tonneau cover is raised above the predetermined angle causing the middle plate to pivot and the latch means to disengage from the latch receiving means.

18. The releasable connecting hinge of claim 17 wherein the pivot means comprises a shaft that passes through aligned holes in the middle plate and top hinge plate.

19. The releasable connecting hinge of claim 16 and further comprising spring means connected to the middle plate for pushing the latch means into the latch receiving means when the latch means is oriented over the latch receiving means.

20. The releasable connecting hinge of claim 17 wherein the portion of the top hinge has a curved rear portion for engaging a complementary curved rear portion of the middle plate after the rear portion of the tonneau cover is raised at least 23° from the truck bed.

* * * * *